(12) United States Patent
Ozog et al.

(10) Patent No.: US 12,078,354 B1
(45) Date of Patent: Sep. 3, 2024

(54) FUEL CONTAINMENT STRUCTURE FOR ENGINE FUEL DELIVERY SYSTEM

(71) Applicant: Pratt & Whitney Canada Corp., Longueuil (CA)

(72) Inventors: Mateusz Ozog, Podkarpackie (PL); Assaf Farah, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/367,302

(22) Filed: Sep. 12, 2023

(51) Int. Cl.
*F23R 3/28* (2006.01)
*F02C 7/22* (2006.01)
*F02C 7/232* (2006.01)

(52) U.S. Cl.
CPC .............. *F23R 3/28* (2013.01); *F02C 7/222* (2013.01); *F02C 7/232* (2013.01); *F05D 2260/608* (2013.01)

(58) Field of Classification Search
CPC .. F02C 7/222; F02C 3/22; F02C 7/232; F23R 3/283; F23R 3/28; F23R 3/346; F23R 3/46; F23R 3/002; Y02T 10/30; F05D 2260/608
See application file for complete search history.

(56) References Cited

U.S. PATENT DOCUMENTS

| | | | |
|---|---|---|---|
| 5,215,835 A | 6/1993 | Jones | |
| 9,701,416 B2* | 7/2017 | Epstein | F02C 7/224 |
| 10,830,150 B2 | 11/2020 | Snyder | |
| 11,371,709 B2* | 6/2022 | Bhagat | F23R 3/002 |
| 11,435,080 B1* | 9/2022 | Morgan | F23R 3/346 |
| 11,603,798 B1* | 3/2023 | Terwilliger | F02C 7/18 |
| 11,635,022 B1* | 4/2023 | Terwilliger | F02C 9/00 60/775 |
| 11,753,993 B1* | 9/2023 | Terwilliger | F02C 3/22 60/266 |
| 11,808,209 B1* | 11/2023 | Sobanski | F02C 6/18 |
| 11,828,200 B2* | 11/2023 | Terwilliger | F01K 27/02 |
| 11,898,491 B1* | 2/2024 | Rocco | F02C 3/30 |
| 2011/0259976 A1* | 10/2011 | Tyler | F23D 11/386 239/125 |
| 2014/0230402 A1* | 8/2014 | Morawski | F02C 7/232 60/39.094 |
| 2018/0266326 A1* | 9/2018 | Soto | F02C 7/222 |
| 2021/0207500 A1* | 7/2021 | Klingels | F01K 23/10 |
| 2022/0349343 A1 | 11/2022 | Durocher | |

(Continued)

*Primary Examiner* — Craig Kim
(74) *Attorney, Agent, or Firm* — Getz Balich LLC (57) ABSTRACT

An engine system is provided that includes an engine core, a fuel containment structure, a fuel containment plenum, a fuel delivery system and a plenum purge circuit. The engine core includes an engine housing structure which houses a compressor section, a combustor section and a turbine section. The fuel containment structure is outboard of and connected to the engine housing structure. The fuel containment plenum is formed by and located between the fuel containment structure and the engine housing structure. The fuel delivery system includes a plurality of fuel injectors, a fuel supply line and a fuel manifold fluidly coupling the fuel supply line to the plurality of fuel injectors. The fuel manifold is arranged within the fuel containment plenum. The plenum purge circuit is configured to purge fuel, when leaked into the fuel containment plenum from the fuel delivery system, out of the fuel containment plenum.

20 Claims, 6 Drawing Sheets

(56) References Cited

U.S. PATENT DOCUMENTS

| | | | |
|---|---|---|---|
| 2022/0404020 A1* | 12/2022 | Stoia | F23R 3/46 |
| 2023/0018918 A1* | 1/2023 | Dillon | F02C 7/222 |
| 2023/0175647 A1 | 6/2023 | Geistbeck | |
| 2023/0294510 A1* | 9/2023 | Orchard | F16L 3/1091 |
| | | | 60/734 |
| 2023/0399986 A1* | 12/2023 | Minas | F02C 9/46 |
| 2024/0110491 A1* | 4/2024 | Clark | F01D 25/246 |

* cited by examiner

FUEL CONTAINMENT STRUCTURE FOR ENGINE FUEL DELIVERY SYSTEM

TECHNICAL FIELD

This disclosure relates generally to an engine and, more particularly, to fuel containment for a fuel delivery system of the engine.

BACKGROUND INFORMATION

As government emissions standards tighten, interest in alternative fuels for gas turbine engines continues to grow. There is interest, for example, in fueling a gas turbine engine with hydrogen fuel rather than a traditional hydrocarbon fuel such as kerosine to reduce greenhouse emissions. Various systems and methods are known in the art for fueling a gas turbine engine with hydrogen fuel. While these known systems and methods have various advantages, there is still room in the art for improvement.

SUMMARY

According to an aspect of the present disclosure, an engine system is provided that includes an engine core, a fuel containment structure, a fuel containment plenum, a fuel delivery system and a plenum purge circuit. The engine core includes a flowpath, a compressor section, a combustor section, a turbine section and an engine housing structure. The flowpath extends through the compressor section, the combustor section and the turbine section from an inlet into the flowpath to an exhaust from the flowpath. The engine housing structure houses the compressor section, the combustor section and the turbine section. The fuel containment structure is outboard of and connected to the engine housing structure. The fuel containment plenum is formed by and located between the fuel containment structure and the engine housing structure. The fuel delivery system includes a plurality of fuel injectors, a fuel supply line and a fuel manifold fluidly coupling the fuel supply line to the plurality of fuel injectors. The fuel manifold is arranged within the fuel containment plenum. The plenum purge circuit is configured to purge fuel, when leaked into the fuel containment plenum from the fuel delivery system, out of the fuel containment plenum.

According to another aspect of the present disclosure, another engine system is provided that includes an engine core, a fuel containment structure, a fuel containment plenum, a fuel delivery system and a plenum purge circuit. The engine core includes a flowpath, a compressor section, a combustor section, a turbine section and an engine case. The flowpath extends through the compressor section, the combustor section and the turbine section from an inlet into the flowpath to an exhaust from the flowpath. The engine case houses at least a portion of the combustor section. The fuel containment structure is outboard of and connected to the engine case. The fuel containment plenum is formed by and located between the fuel containment structure and the engine case. The fuel delivery system is configured to direct fuel into a combustion chamber within the combustor section. The fuel delivery system includes a plurality of components arranged within the fuel containment plenum. The plenum purge circuit is configured to fluidly couple the fuel containment plenum to an external environment.

According to still another aspect of the present disclosure, another engine system is provided that includes an engine core, a fuel containment structure, a fuel containment plenum, a hydrogen fuel delivery system and a plenum purge circuit. The engine core includes a flowpath, a compressor section, a combustor section, a turbine section and an engine case. The flowpath extends through the compressor section, the combustor section and the turbine section from an inlet into the flowpath to an exhaust from the flowpath. The engine case houses at least a portion of the combustor section. The fuel containment structure is radially outboard of and circumscribes the engine case. The fuel containment plenum is formed by and located radially between the engine case and the fuel containment structure. The hydrogen fuel delivery system is configured to deliver hydrogen fuel to the combustor section. The hydrogen fuel delivery system includes a plurality of lines and a plurality of fittings arranged within the fuel containment plenum. The plenum purge circuit is configured to purge the hydrogen fuel, when leaked into the fuel containment plenum from the fuel delivery system, out of the fuel containment plenum.

The engine system may also include a flushing circuit configured to fluidly couple the external environment to the fuel containment plenum.

The engine system may also include a pressurized air source and a flushing circuit configured to fluidly couple the pressurized air source to the fuel containment plenum.

The plenum purge circuit may be configured to vent the fuel purged from the fuel containment plenum to an environment external to the engine system.

The plenum purge circuit may project out from the fuel containment structure to an outlet. The plenum purge circuit may include a valve arranged inline between the fuel containment plenum and the outlet.

The plenum purge circuit may project out from the fuel containment structure to an outlet. The plenum purge circuit may include a pump arranged inline between the fuel containment plenum and the outlet.

The engine system may also include a flushing circuit configured to direct air into the fuel containment plenum to flush the fuel out of the fuel containment plenum through the plenum purge circuit.

The flushing circuit may project out from the fuel containment structure to an inlet. The flushing circuit may include a valve arranged inline between the inlet and the fuel containment plenum.

The flushing circuit may project out from the fuel containment structure to an inlet. The flushing circuit may include a pump arranged inline between the inlet and the fuel containment plenum.

The engine system may also include an air source configured to provide the air to the flushing circuit.

The air source may be configured as or otherwise include an environment external to the engine system.

The air source may be configured as or otherwise include a bleed from the flowpath.

A connection between the fuel manifold and the fuel supply line may be arranged within the fuel containment plenum. In addition or in alternative, a connection between the fuel manifold and at least one of the fuel injectors may be arranged within the fuel containment plenum.

The fuel delivery system may also include a flow regulator configured to regulate fuel flow to the fuel injectors. The flow regulator may be arranged within the fuel containment plenum.

The fuel manifold may include a plurality of manifold lines and a plurality of manifold fittings interconnecting the manifold lines. The manifold lines and the manifold fittings may be arranged within the fuel containment plenum.

The engine housing structure may be between and fluidly separate the fuel containment plenum from the flowpath.

The engine system may also include an aircraft structure. The engine core may be housed in the aircraft structure. The fuel containment structure may be between and fluidly separate the fuel containment plenum from a compartment volume within the aircraft structure and extending about the engine core.

The fuel containment structure may circumscribe the engine core.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIGS. 4A-8B are partial schematic illustrations of the engine system with various fuel containment structure arrangements.

DETAILED DESCRIPTION

Figure 1:
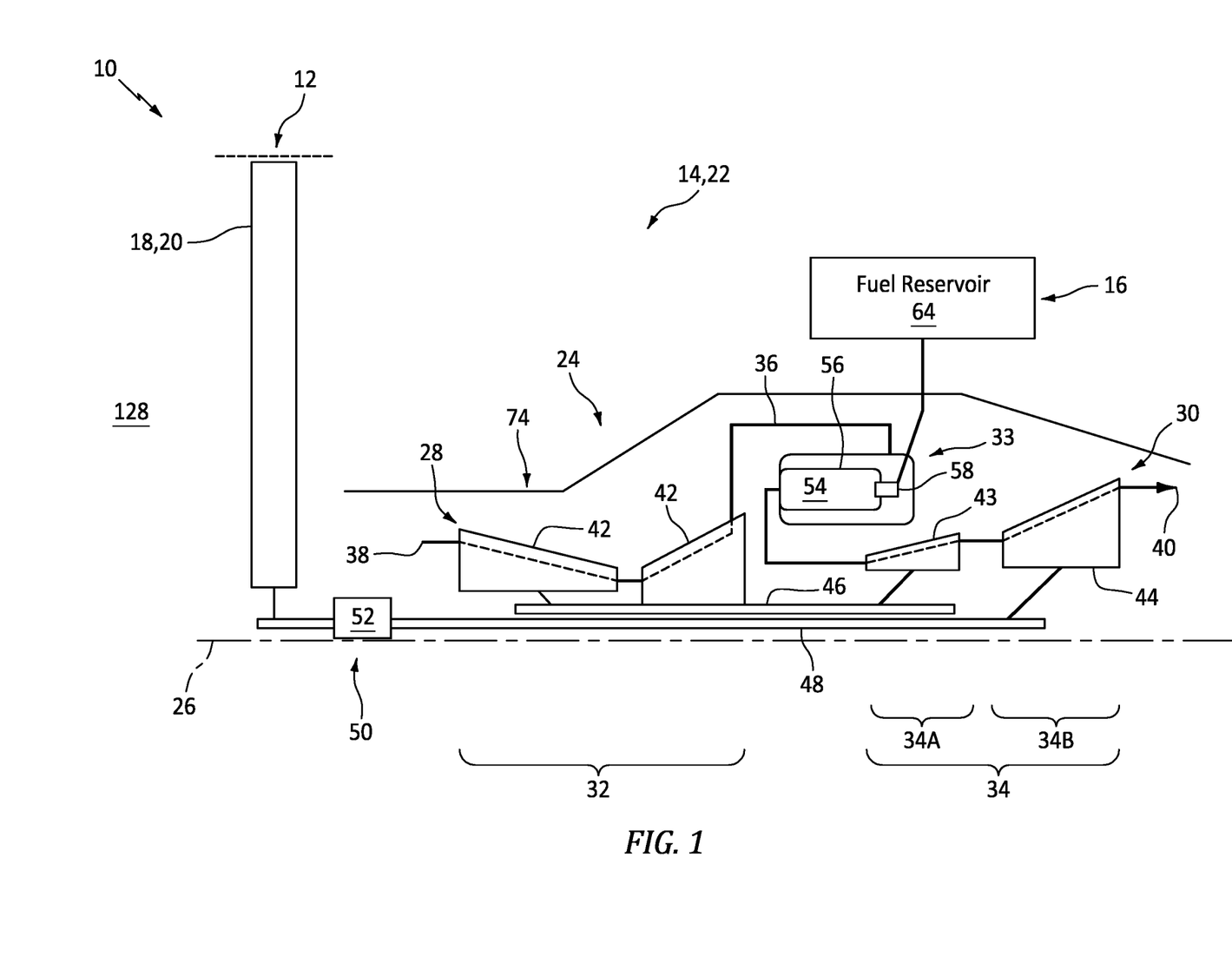
FIG. 1 is a partial schematic illustration of an engine system for an aircraft.

FIG. 1 illustrates an engine system 10 for an aircraft. The aircraft may be an airplane, a helicopter, a drone (e.g., an unmanned aerial vehicle (UAV)) or any other manned or unmanned aerial vehicle or system. The engine system 10 may be configured as, or otherwise included as part of, a propulsion system for the aircraft. The engine system 10 may also or alternatively be configured as, or otherwise included as part of, an electrical power system for the aircraft. The engine system 10 of FIG. 1 includes a mechanical load 12 and an aircraft engine 14 configured to power operation of the mechanical load 12. The aircraft system 10 also include a fuel delivery system 16 for the aircraft engine 14.

The mechanical load 12 may be configured as or otherwise include a rotor 18 mechanically driven and/or otherwise powered by the aircraft engine 14. This driven rotor 18 may be a bladed propulsor rotor 20 (e.g., an air mover) where the aircraft system 10 is (or is part of) the aircraft propulsion system. The propulsor rotor 20 includes a plurality of rotor blades arranged circumferentially around and connected to at least (or only) one rotor base (e.g., a disk or a hub). The propulsor rotor 20 may be an open (e.g., un-ducted) propulsor rotor or a ducted propulsor rotor. Examples of the open propulsor rotor include a propeller rotor for a turboprop propulsion system, a rotorcraft rotor (e.g., a main helicopter rotor) for a turboshaft propulsion system, a propfan rotor for a propfan propulsion system, and a pusher fan rotor for a pusher fan propulsion system. An example of the ducted propulsor rotor is a fan rotor for a turbofan propulsion system. The present disclosure, however, is not limited to the foregoing exemplary propulsor rotor arrangements. Moreover, the driven rotor 18 may alternatively be a generator rotor of an electric power generator where the aircraft system 10 is (or is part of) the aircraft power system; e.g., an auxiliary power unit (APU) for the aircraft.

The aircraft engine 14 is configured as an internal combustion (IC) engine. The aircraft engine 14 of FIG. 1, for example, is configured as a gas turbine engine 22. A core 24 of this gas turbine engine 22 extends axially along an axis 26 between an upstream, forward end of the engine core 24 and a downstream, aft end of the engine core 24. This axis 26 may be a centerline axis of the gas turbine engine 22 and/or its engine core 24. The axis 26 may also or alternatively be a rotational axis of one or more rotating assemblies (e.g., 28 and 30) of the gas turbine engine 22 and its engine core 24. The engine core 24 of FIG. 1 includes a compressor section 32, a combustor section 33, a turbine section 34 and a core flowpath 36. The turbine section 34 of FIG. 1 includes a high pressure turbine (HPT) section 34A and a low pressure turbine (LPT) section 34B; e.g., a power turbine (PT) section. The core flowpath 36 extends longitudinally sequentially through the compressor section 32, the combustor section 33, the HPT section 34A and the LPT section 34B from an airflow inlet 38 into the core flowpath 36 to a combustion products exhaust 40 from the core flowpath 36. The core inlet 38 may be disposed at (e.g., on, adjacent or proximate) the forward end of the engine core 24, and the core exhaust 40 may be disposed at the aft end of the engine core 24.

Each of the engine sections 32, 34A and 34B includes one or more respective bladed rotors 42-44. Each of these engine rotors 42-44 includes a plurality of rotor blades (e.g., airfoils, vanes, etc.) arranged circumferentially around and connected to at least (or only) one rotor base (e.g., a disk, a hub, etc.). The rotor blades, for example, may be formed integral with or mechanically fastened, welded, brazed and/or otherwise attached to the respective rotor base(s).

The compressor rotors 42 are coupled to and rotatable with the HPT rotor 43. The compressor rotors 42 of FIG. 1, for example, are connected to the HPT rotor 43 by a high speed shaft 46. At least (or only) the compressor rotors 42, the HPT rotor 43 and the high speed shaft 46 collectively form the high speed rotating assembly 28; e.g., a high speed spool. The LPT rotor 44 is connected to a low speed shaft 48. At least (or only) the LPT rotor 44 and the low speed shaft 48 collectively form the low speed rotating assembly 30. This low speed rotating assembly 30 is further coupled to the driven rotor 18 (e.g., the propulsor rotor 20) through a drivetrain 50. The drivetrain 50 may be configured as a geared drivetrain, where a geartrain 52 (e.g., a transmission, a speed change device, an epicyclic geartrain, etc.) is disposed between and operatively couples the driven rotor 18 to the low speed rotating assembly 30 and its LPT rotor 44. With this arrangement, the driven rotor 18 may rotate at a different (e.g., slower) rotational velocity than the low speed rotating assembly 30 and its LPT rotor 44. However, the drivetrain 50 may alternatively be configured as a direct drive drivetrain, where the geartrain 52 is omitted. With this arrangement, the driven rotor 18 rotates at a common (the same) rotational velocity as the low speed rotating assembly 30 and its LPT rotor 44. Referring again to FIG. 1, each of the rotating assemblies 28 and 30 and its members may be rotatable about the axis 26.

During operation of the gas turbine engine 22, air may be directed across the driven rotor 18 (e.g., the propulsor rotor 20) and into the engine core 24 through the core inlet 38. This air entering the core flowpath 36 may be referred to as core air. The core air is compressed by the compressor rotors 42 and directed into a combustion chamber 54 (e.g., an annular combustion chamber) within a combustor 56 (e.g., an annular combustor) of the combustor section 33. Fuel is injected into the combustion chamber 54 by one or more fuel injectors 58 and mixed with the compressed core air to provide a fuel-air mixture. This fuel-air mixture is ignited and combustion products thereof flow through and sequentially cause the HPT rotor 43 and the LPT rotor 44 to rotate. The rotation of the HPT rotor 43 drives rotation of the compressor rotors 42 and, thus, the compression of the air received from the core inlet 38. The rotation of the LPT rotor 44 drives rotation of the driven rotor 18. Where the driven rotor 18 is configured as the propulsor rotor 20, the rotation of that propulsor rotor 20 may propel additional air (e.g., outside air, bypass air, etc.) outside of the engine core 24 to provide aircraft thrust and/or lift. Where the driven rotor 18 is configured as the generator rotor, the rotation of that generator rotor may facilitate generation of electricity.

Figure 2:
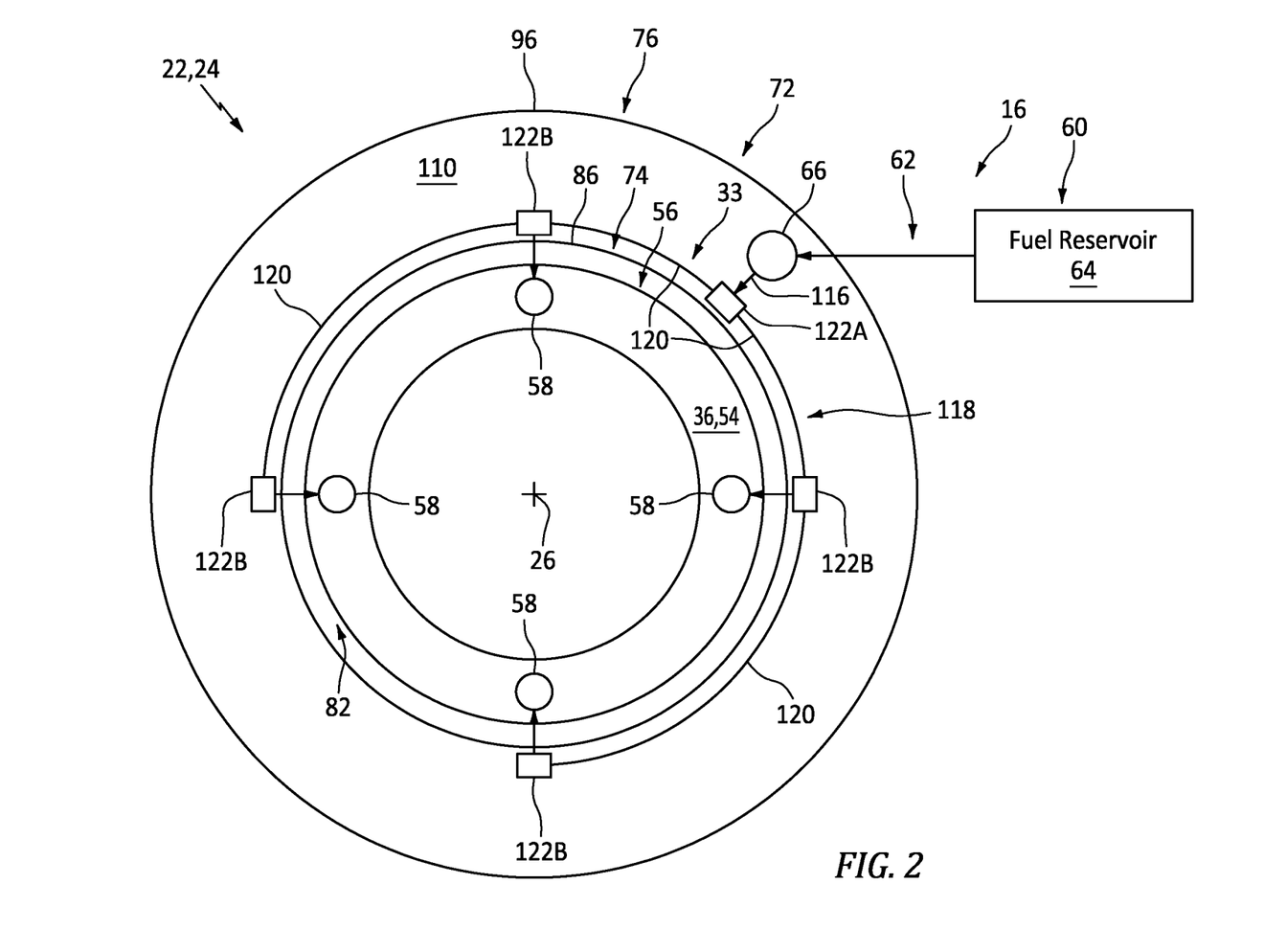
FIG. 2 is a partial schematic illustration of a combustor section of the engine system with a fuel delivery system and a fuel containment system.

Referring to FIG. 2, the fuel delivery system 16 is configured to deliver the fuel to the combustor section 33 and its combustor 56 for combustion. The fuel delivery system 16 of FIG. 2, for example, includes a fuel source 60, a fuel supply circuit 62 and the one or more fuel injectors 58. The fuel source 60 of FIG. 2 includes a fuel reservoir 64 and a fuel flow regulator 66; e.g., a valve and/or a pump. The fuel reservoir 64 is configured to store the fuel before, during and/or after turbine engine operation. The fuel flow regulator 66 is configured to direct and/or meter a flow of the fuel from the fuel reservoir 64 to the fuel injectors 58 through the fuel supply circuit 62. The fuel injectors 58 may be arranged circumferentially about the axis 26 in an array. Each fuel injector 58 is configured to direct the fuel received from the fuel source 60 into the combustion chamber 54 for mixing with the compressed core air to provide the fuel-air mixture.

The aircraft engine 14 of FIG. 1 may be configured as a non-hydrocarbon engine/a hydrocarbon free engine. The aircraft engine 14, for example, may be configured as a hydrogen fueled engine, where the fuel injected into the combustion chamber 54 by the fuel injectors 58 is (or substantially includes) hydrogen ($H_2$) fuel. The hydrogen fuel injected by the fuel injectors 58 into the combustion chamber 54 may be in a gaseous phase; e.g., $H_2$ gas. The hydrogen fuel stored within the fuel reservoir 64, however, may be (e.g., substantially or completely) in a liquid phase; e.g., liquid $H_2$. In another example, the aircraft engine 14 may also or alternatively be fueled by another a non-hydrocarbon fuel and/or even a (e.g., gaseous) hydrocarbon fuel such as, but not limited to, natural gas, propane or the like. Such fuels may have a relatively low flash point/evaporation temperature. Such fuels, particularly hydrogen fuel, may thereby be readily flammable/combustible when in the presence of oxygen and an ignition source; e.g., a flame, a spark, a relatively hot object, etc. Special care may therefore be provided for containing the fuel onboard the aircraft. For example, to contain potential fuel leakage out of the fuel delivery system 16 proximate the aircraft engine 14 (e.g., the gas turbine engine 22), the engine system 10 of FIG. 3 includes a fuel containment system 72; e.g., a hydrogen fuel containment system.

Figure 3:
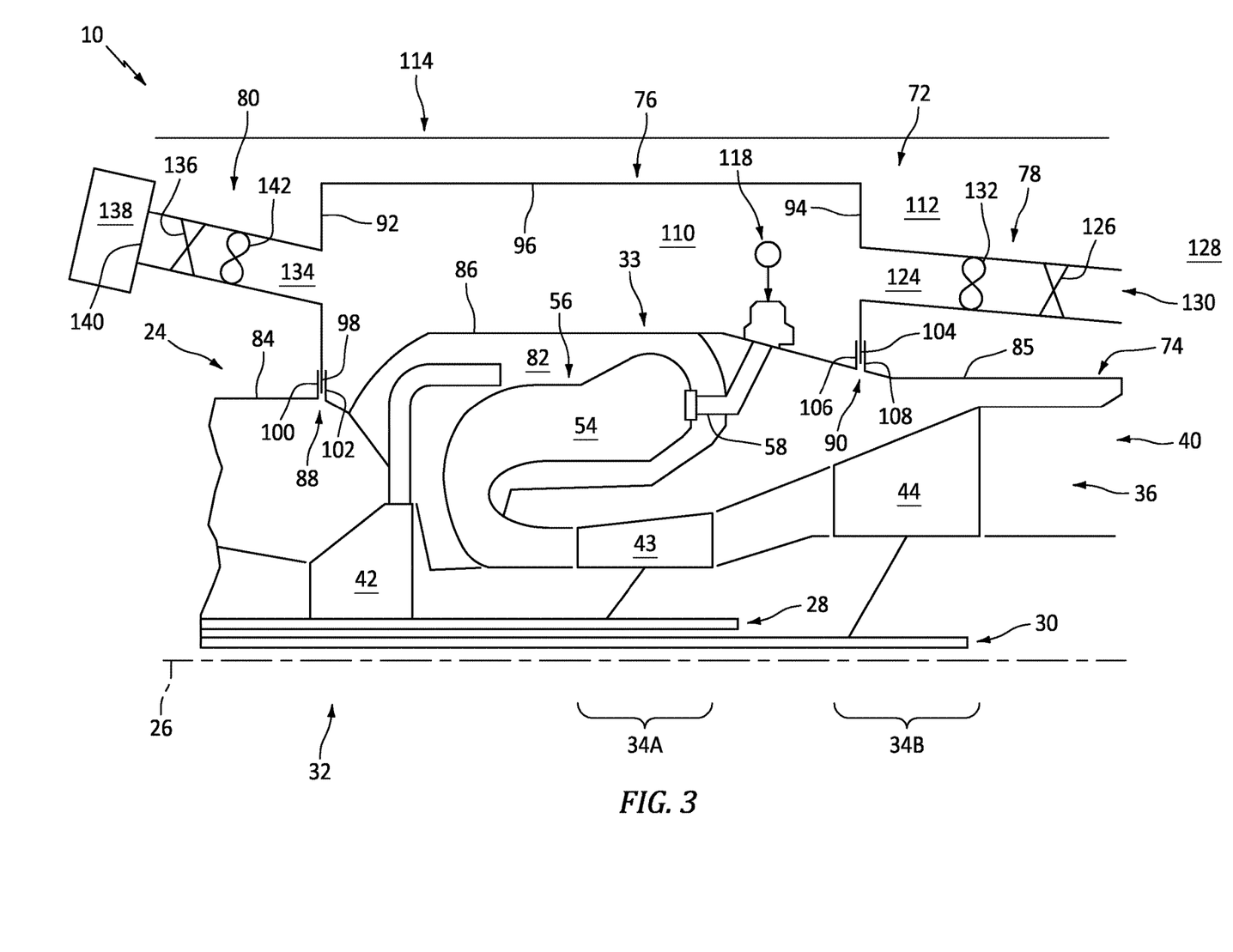
FIG. 3 is a partial schematic illustration of the engine system with the fuel delivery system and the fuel containment system.

The fuel containment system 72 of FIG. 3 includes an engine housing structure 74, a fuel containment structure 76 and a plenum purge circuit 78. This fuel containment system 72 may also include a plenum flushing circuit 80.

The engine housing structure 74 is configured to house at least (or only) the engine core 24. The engine housing structure 74 of FIG. 3, for example, forms a (e.g., fluid impermeable) multi-segment casing which at least partially or completely houses the compressor section 32, the combustor section 33, the HPT section 34A and the LPT section 34B; see also FIGS. 1 and 2. This engine housing structure 74 is radially outboard of, extends axially along (e.g., axially overlaps) and extends circumferentially about (e.g., circumscribes) the engine core 24 and its engine sections 32-34B. The engine housing structure 74 of FIG. 3 may also form one or more outer peripheral portions of the core flowpath 36 within the aircraft engine 14. The engine housing structure 74 of FIG. 3, for example, forms an outer peripheral boundary of a diffuser plenum 82 within the combustor section 33, where the combustor 56 is disposed within the diffuser plenum 82, and where the diffuser plenum 82 forms a longitudinal section of the core flowpath 36 between the compressor section 32 and the combustion chamber 54.

The engine housing structure 74 of FIG. 3 is formed by a plurality of interconnected engine cases 84-86. The compressor case 84 may house at least a portion (or an entirety) of the compressor section 32 and one or more of its compressor rotors 42. The turbine case 85 may house at least a portion (or an entirety) of the turbine section 34 (e.g., the LPT section 34B) and its LPT rotor 44. The combustor section case 86 (e.g., an outer diffuser case) may house at least a portion (or an entirety) of the combustor section 33. The combustor section case 86 of FIG. 3 also axially overlaps and circumscribes at least a portion (or an entirety) of the HPT section 34A and its HPT rotor 43; e.g., the combustor 56 of FIG. 3 is disposed radially outboard of and axially overlaps the HPT section 34A. The combustor section case 86 is disposed axially between and attached to the compressor case 84 and the turbine case 85. The combustor section case 86 of FIG. 3, for example, axially engages and is mechanically attached to the compressor case 84 at a forward bolted flange connection 88. The combustor section case 86 of FIG. 3 further axially engages and is mechanically attached to the turbine case 85 at an aft bolted flange connection 90. The present disclosure, however, is not limited to such an exemplary arrangement of engine cases.

The fuel containment structure 76 may be configured as a (e.g., fluid impermeable) tubular (or arcuate) casing about the engine core 24 and its engine housing structure 74. The fuel containment structure 76 of FIG. 3, for example, is radially outboard of, extends axially along (e.g., axially overlaps) and extends circumferentially about (e.g., circumscribes) at least (or only) the combustor section 33 and the combustor section case 86. This fuel containment structure 76 includes an annular forward endwall 92, an annular aft endwall 94 and a tubular sidewall 96.

The forward endwall 92 may be arranged at a forward end of the fuel containment structure 76 and its sidewall 96. This forward endwall 92 projects out from the sidewall 96, in a radial inward direction towards the axis 26, to an inner distal end 98 of the forward endwall 92. The forward endwall 92 may be attached to the engine housing structure 74 at its distal end 98. The forward endwall 92 of FIG. 3, for example, is mechanically fastened to the engine housing structure 74 and one or more of its engine cases 84 and 86 at the forward bolted flange connection 88. Here, the forward endwall 92 is arranged axially between and axially engaged with (e.g., abutted against) an aft flange 100 of the compressor case 84 and a forward flange 102 of the combustor section case 86. The present disclosure, however, is not limited to such an exemplary connection between the forward endwall 92 and the engine housing structure 74. The forward endwall 92, for example, may alternatively be axially engaged with and axially forward of the aft flange 100 of the compressor case 84. In another example, the forward endwall 92 may alternatively be axially engaged with and axially aft of the forward flange 102 of the combustor section case 86. In still another example, the forward endwall 92 may alternatively be mechanically attached to another mounting point along the engine housing structure 74 and one of its engine cases 84, 86.

The aft endwall 94 may be arranged at an aft end of the fuel containment structure 76 and its sidewall 96. This aft endwall 94 projects out from the sidewall 96, in the radial inward direction towards the axis 26, to an inner distal end 104 of the aft endwall 94. The aft endwall 94 may be attached to the engine housing structure 74 at its distal end 104. The aft endwall 94 of FIG. 3, for example, is mechanically fastened to the engine housing structure 74 and one or more of its engine cases 85 and 86 at the aft bolted flange connection 90. Here, the aft endwall 94 is arranged axially between and axially engaged with (e.g., abutted against) an aft flange 106 of the combustor section case 86 and a forward flange 108 of the turbine case 85. The present disclosure, however, is not limited to such an exemplary connection between the aft endwall 94 and the engine housing structure 74. The aft endwall 94, for example, may alternatively be axially engaged with and axially forward of the aft flange 106 of the combustor section case 86. In another example, the aft endwall 94 may alternatively be axially engaged with and axially aft of the forward flange 108 of the turbine case 85. In still another example, the aft endwall 94 may alternatively be mechanically attached to another mounting point along the engine housing structure 74 and one of its engine cases 85, 86.

The sidewall 96 is arranged between and is connected to the forward endwall 92 and the aft endwall 94. The sidewall 96 of FIG. 3, for example, extends (e.g., axially) along the engine housing structure 74 and its combustor section case 86 from the forward endwall 92 to the aft endwall 94.

A fuel containment plenum 110 (e.g., a hydrogen fuel containment plenum) is formed by and extends (e.g., radially) between (a) the fuel containment structure 76 and its sidewall 96 and (b) the engine housing structure 74 and its combustor section case 86. This fuel containment plenum 110 is formed by and extends (e.g., axially) between the forward endwall 92 and the aft endwall 94. The fuel containment plenum 110 also extends circumferentially about (e.g., completely around) the axis 26 and the engine housing structure 74 and its combustor section case 86; see also FIG. 2. At least (or only) the engine housing structure 74 and its combustor section case 86 may thereby be (e.g., radially) between and fluidly separate the fuel containment plenum 110 from the core flowpath 36. Similarly, at least (or only) the fuel containment structure 76 may be (e.g., radially and/or axially) between and fluidly separate the fuel containment plenum 110 from a surrounding compartment volume 112 in which the engine core 24 and the fuel containment system 72 are housed. Here, the compartment volume 112 is formed by and within an aircraft structure 114, which aircraft structure 114 may be a nacelle for the aircraft engine 14, a fuselage for the aircraft, etc.

Referring to FIG. 2, the fuel supply circuit 62 includes a fuel supply line 116 (e.g., a pipe, a hose, a tube, etc.) and a fuel manifold 118. The fuel supply line 116 fluidly couples the fuel source 60 and its fuel reservoir 64 to the fuel manifold 118. The fuel flow regulator 66 may be arranged inline along the fuel supply line 116 between the fuel reservoir 64 and the fuel manifold 118. The fuel manifold 118 fluidly couples the fuel supply line 116 to each of the fuel injectors 58. The fuel manifold 118 of FIG. 2, for example, is configured to (e.g., evenly) distribute the fuel received from the fuel source 60 through the fuel supply line 116 to some or all of the fuel injectors 58. This fuel manifold 118 may include a plurality of fuel lines 120 and one or more fittings 122A and 122B (generally referred to as "122") which fluidly interconnect the fuel lines 120 together. The inlet fitting 122A fluidly couples the fuel supply line 116 to the fuel manifold 118 at a fluid connection therebetween. Each injector fitting 122B fluidly couples the fuel manifold 118 to a respective one of the fuel injectors 58 at a fluid connection therebetween.

One or more components of the fuel delivery system 16 are arranged partially or completely within the fuel containment plenum 110. These fuel delivery components may include, but are not limited to, the fuel supply line 116, the fuel manifold 118 and the fuel injectors 58 (or lines fluidly coupling the fuel injectors 58 to the fuel manifold 118). The fuel supply circuit 62 and its fuel supply line 116 of FIG. 2, for example, extend across the fuel containment structure 76 into the fuel containment plenum 110 to the inlet fitting 122A. The fuel manifold 118 and its members 120 and 122 of FIG. 2 are disposed entirely within the fuel containment plenum 110. Each fuel injector 58 of FIG. 2 (or the respective line fluidly coupling the fuel injector 58 to the fuel manifold 118) extends across the engine housing structure 74 into the fuel containment plenum 110 to the injector fitting 122B. The fuel flow regulator 66 (or another fuel flow regulator arranged inline along the fuel circuit 62) and/or one or more other fuel related devices may also be arranged partially or completely within the fuel containment plenum 110. For example, substantially the entire fuel delivery system 16 besides nozzles of the fuel injectors 58 and the fuel reservoir 64 may be arranged within the fuel containment plenum 110. With this arrangement, fuel which leaks out of the fuel delivery system 16 and its components (e.g., 58, 116, 118) (if any) may be contained within a common volume—the fuel containment plenum 110.

Referring to FIG. 3, the leaked fuel may be purged/vented from the fuel containment plenum 110 using the plenum purge circuit 78. The plenum purge circuit 78 of FIG. 3 includes a plenum purge channel 124 and a plenum purge valve 126. This plenum purge circuit 78 is configured to selectively fluidly couple the fuel containment plenum 110 to an environment 128 (or another cavity, passage or flowpath within the aircraft engine 14). The environment 128 may be external to the fuel delivery system 16, the engine system 10 and, more generally, the aircraft. The plenum purge circuit 78 of FIG. 3 and its plenum purge channel 124 project out from the fuel containment structure 76 to an outlet 130 to ambient. The plenum purge valve 126 is arranged inline along the plenum purge channel 124 between the fuel containment plenum 110 and the outlet 130. With this arrangement, the plenum purge valve 126 may open and the plenum purge circuit 78 may discharge the leaked fuel relatively far away from potential sources of ignition. However, when there is relatively little or no leaked fuel, the plenum purge valve 126 may close to fluidly decouple the fuel containment plenum 110 from the outlet 130/the external environment 128.

In some embodiments, the plenum purge circuit 78 may also include a pump 132 (e.g., a gas pump such as an electric fan or a blower) arranged inline along the plenum purge channel 124 between the fuel containment plenum 110 and the outlet 130. The purge circuit pump 132 of FIG. 3, for example, is arranged inline along the plenum purge channel 124 between the fuel containment plenum 110 and the plenum purge valve 126. When the plenum purge valve 126 is open (or omitted), the purge circuit pump 132 may be operated to draw at least the leaked fuel out of the fuel containment plenum 110 for exhausting into the external environment 128.

The flushing circuit 80 of FIG. 3 includes a flushing channel 134 and a flushing valve 136. This flushing circuit 80 is configured to selectively fluidly couple the fuel containment plenum 110 to a flushing fluid source such as an air source 138. This air source 138 may be configured as the external environment 128. The flushing circuit 80 of FIG. 3 and its flushing channel 134, for example, project out from the fuel containment structure 76 to an inlet 140. The flushing circuit 80 may also include an air pump 142 (e.g., an electric fan/blower) which directs ambient air from the external environment 128, through the flushing channel 134, into the containment plenum. Alternatively, the air source 138 may be a pressurized air source such as a bleed from a flowpath of the aircraft engine 14; e.g., a core flowpath bleed, a bypass flowpath bleed, etc. With the foregoing arrangement, forced air is directed into the fuel containment plenum 110 to flush out the leaked fuel from the fuel containment plenum 110 through the plenum purge circuit 78. In addition to flushing out the leaked fuel, the air directed into the fuel containment plenum 110 may also dilute the leaked fuel. However, when there is relatively little or no leaked fuel, the flushing valve 136 may close to fluidly decouple the air source 138 from the fuel containment plenum 110.

In some embodiments, the plenum purge circuit 78 and its plenum purge channel 124 may be fluidly coupled to the fuel containment plenum 110 at or about a gravitational bottom (e.g., lowest point) of the fuel containment structure 76; e.g., a bottom side of the aircraft engine 14. With this arrangement, the plenum purge circuit 78 may also be used to purge/drain water (e.g., condensation) from the fuel containment plenum 110. In other embodiments, the plenum purge circuit 78 and its plenum purge channel 124 may be fluidly coupled to the fuel containment plenum 110 at or about a gravitational top (e.g., highest point) of the fuel containment structure 76, where there is a separate water drain for the fuel containment plenum 110 for example. With this arrangement, an inlet to the plenum purge circuit 78 may be located closer to a bulk mass of the leaked fuel, if any, within the fuel containment plenum 110 where the leaked fuel (e.g., hydrogen gas) is less dense/lighter than air.

In some embodiments, the plenum purge circuit 78 and its plenum purge valve 126 may be selectively opened and closed based on presence, if any, of the leaked fuel within the fuel containment plenum 110. In other embodiments, the plenum purge circuit 78 and its plenum purge valve 126 (if still included) may (e.g., always) be open during normal operation to continually purge/vent the leaked fuel, if any, from the fuel containment plenum 110.

Figure 4A:
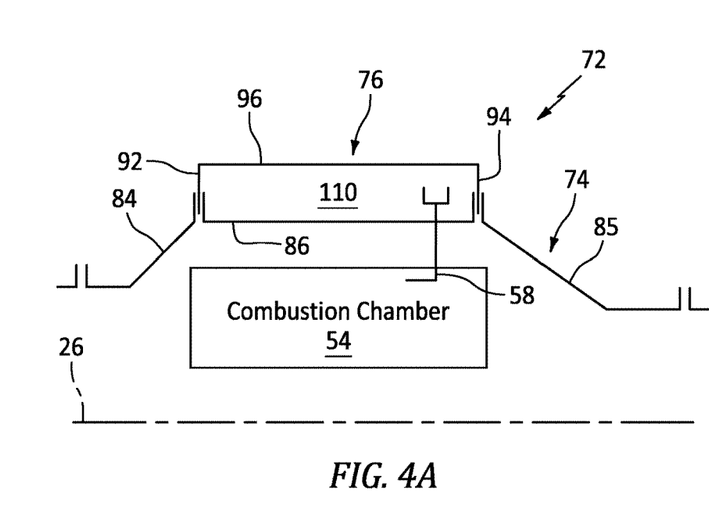
Figure 4B:
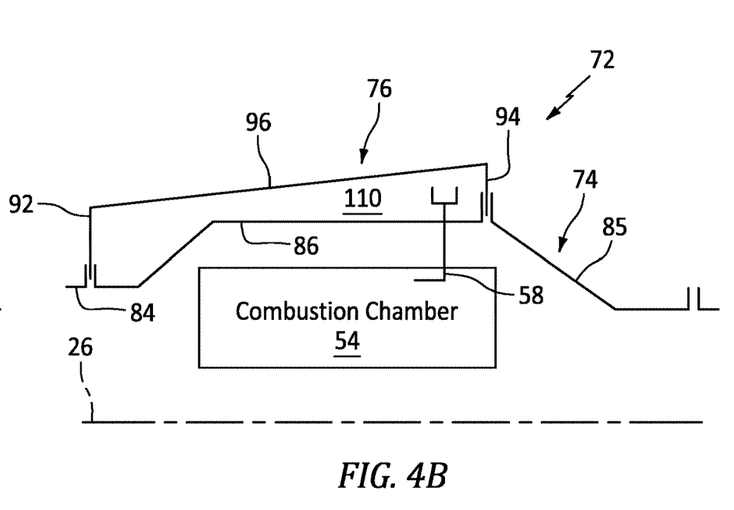
Figure 4C:
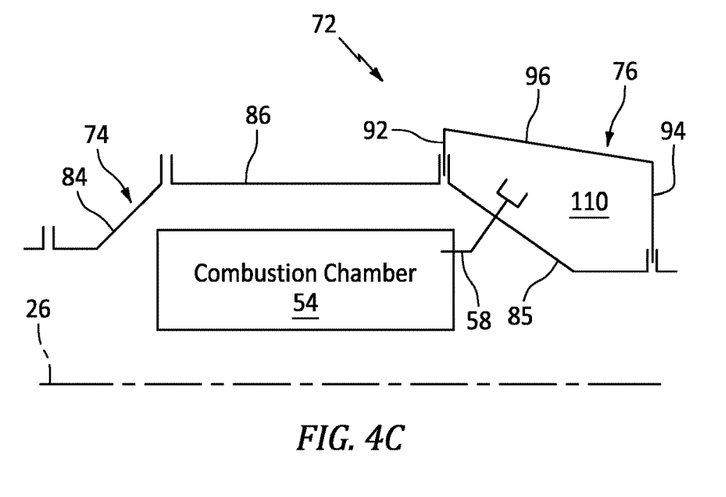
Figure 5:
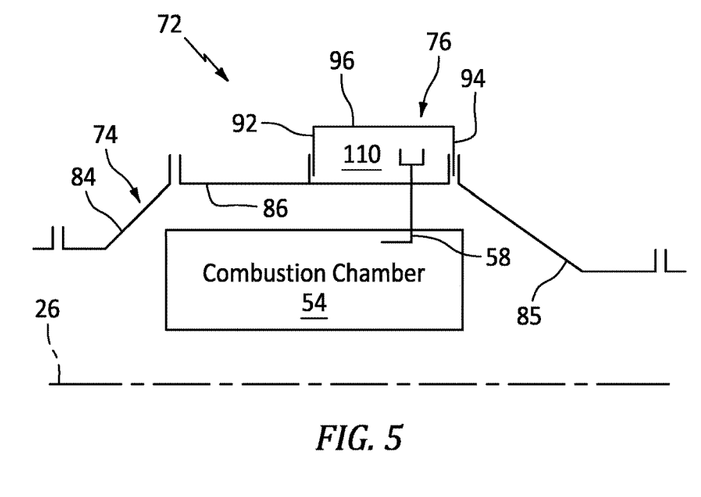

In some embodiments, referring to FIGS. 4A-C, the fuel containment structure 76 may extend axially along and completely overlap the engine case with which it forms the fuel containment plenum 110; e.g., the combustor section case 86, the turbine case 85, etc. In other embodiments, referring to FIG. 5, the fuel containment structure 76 may extend axially along and partially overlap the engine case with which it forms the fuel containment plenum 110; e.g., the combustor section case 86, etc.

Figure 6:
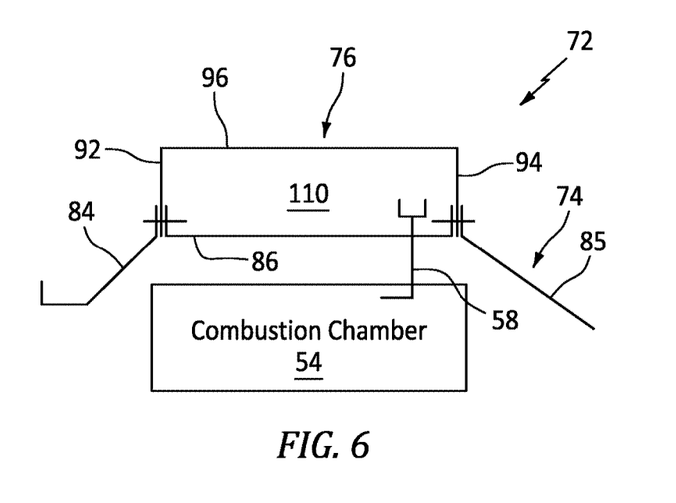
Figure 7:
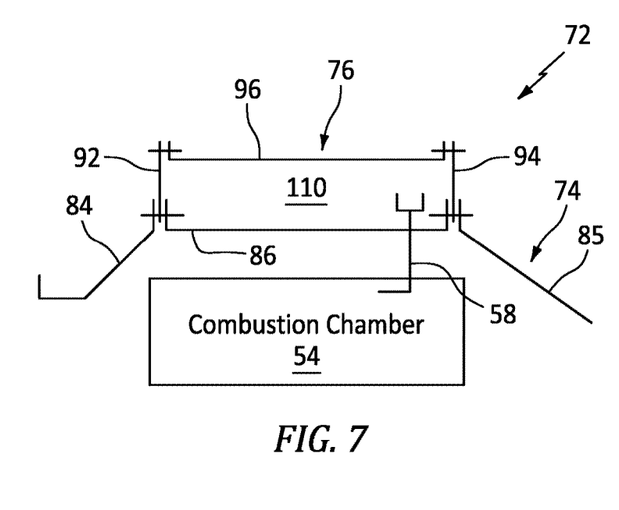

In some embodiments, referring to FIG. 6, the sidewall 96 may be formed integral with the forward endwall 92 and/or the aft endwall 94. In other embodiments, referring to FIG. 7, the sidewall 96 may be formed discrete from the forward endwall 92 and/or the aft endwall 94. With this arrangement, the sidewall 96 may be mechanically fastened and/or otherwise attached to the forward endwall 92 and/or the aft endwall 94. With this arrangement, the sidewall 96 may be formed from a different material than the forward endwall 92 and/or the aft endwall 94. The sidewall 96, for example, may be formed from a composite material whereas the forward endwall 92 and/or the aft endwall 94 may be formed from metal; e.g., titanium (Ti), nickel (Ni) or alloys thereof. Alternatively, the fuel containment structure 76 and tis members 92, 94 and 96 may be formed from a common (the same) material; e.g., metal.

Figure 8A:
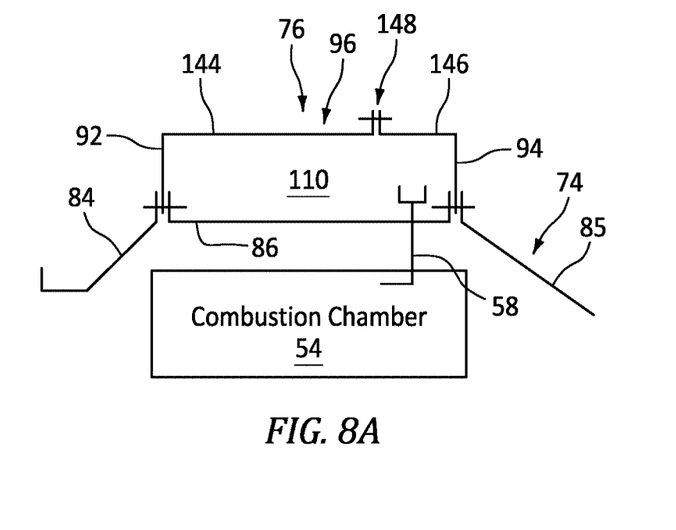
Figure 8B:
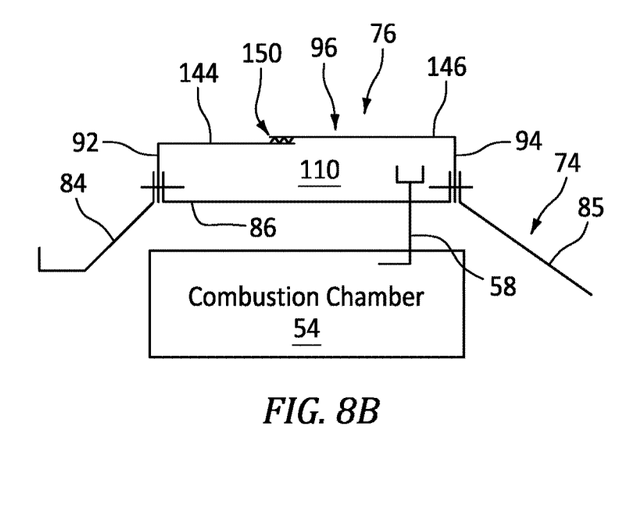

In some embodiments, referring to FIGS. 8A and 8B, the sidewall 96 may include a plurality of interconnected segments 144 and 146. The forward segment 144 of FIGS. 8A and 8B is formed integral with (or otherwise attached to) the forward endwall 92. The aft segment 146 of FIGS. 8A and 8B is formed integral with (or otherwise attached to) the aft endwall 94. This aft segment 146 engages and is coupled to the forward segment 144. The aft segment 146 of FIG. 8A, for example, is mechanically fastened to the forward segment 144 by a bolted flange connection 148. In another example, the forward segment 144 may be nested within the aft segment 146 (or vice versa), and the forward segment 144 and the aft segment 146 may meet at a sealed interface 150.

Figure 9:
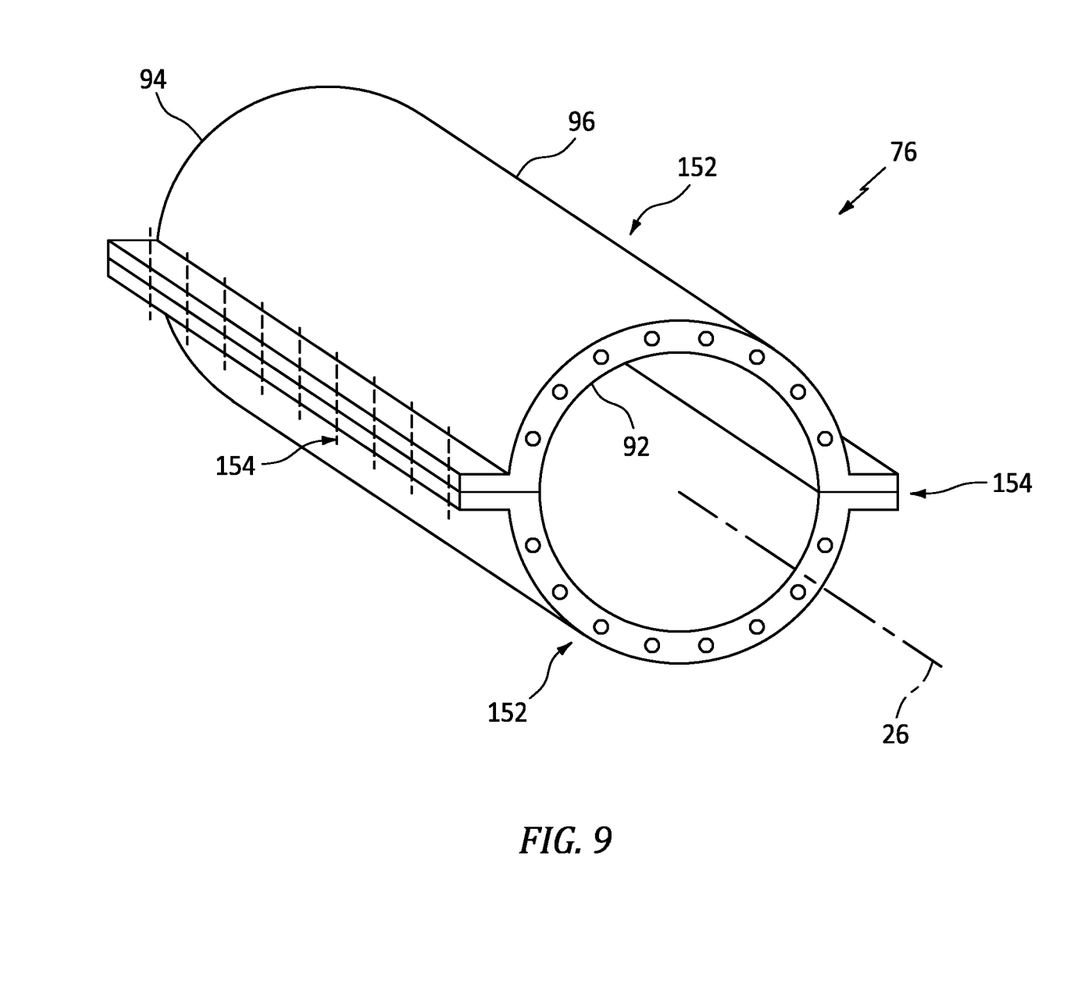
FIG. 9 is a perspective illustration of the fuel containment structure with a plurality of circumferential segments.

In some embodiments, the fuel containment structure 76 and its members 92, 94 and 96 may be formed as full hoop body. In other embodiments, referring to FIG. 9, the fuel containment structure 76 and its members 92, 94 and 96 may be divided into a plurality of arcuate segments 152; e.g., halves. Each of these arcuate segments 152 extends circumferentially about the axis 26 between opposing circumferential sides. Each circumferential side of each arcuate segment 152 circumferentially engages a respective adjacent arcuate segment 152, and these arcuate segments 152 are mechanically fastened together; e.g., via bolted flange connections 154.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:
1. An engine system, comprising:
an engine core including a flowpath, a compressor section, a combustor section, a turbine section and an engine housing structure, the flowpath extending through the compressor section, the combustor section and the turbine section from an inlet into the flowpath to an exhaust from the flowpath, and the engine housing structure housing the compressor section, the combustor section and the turbine section;
a fuel containment structure outboard of and connected to the engine housing structure;
a fuel containment plenum formed by and located between the fuel containment structure and the engine housing structure;
a fuel delivery system including a plurality of fuel injectors, a fuel supply line and a fuel manifold fluidly coupling the fuel supply line to the plurality of fuel injectors, the fuel manifold arranged within the fuel containment plenum; and a plenum purge circuit configured to purge fuel, when leaked into the fuel containment plenum from the fuel delivery system, out of the fuel containment plenum.

2. The engine system of claim 1, wherein the plenum purge circuit is configured to vent the fuel purged from the fuel containment plenum to an environment external to the engine system.

3. The engine system of claim 1, wherein
the plenum purge circuit projects out from the fuel containment structure to an outlet; and
the plenum purge circuit includes a valve arranged inline between the fuel containment plenum and the outlet.

4. The engine system of claim 1, wherein
the plenum purge circuit projects out from the fuel containment structure to an outlet; and
the plenum purge circuit includes a pump arranged inline between the fuel containment plenum and the outlet.

5. The engine system of claim 1, further comprising a flushing circuit configured to direct air into the fuel containment plenum to flush the fuel out of the fuel containment plenum through the plenum purge circuit.

6. The engine system of claim 5, wherein
the flushing circuit projects out from the fuel containment structure to an inlet; and
the flushing circuit includes a valve arranged inline between the inlet and the fuel containment plenum.

7. The engine system of claim 5, wherein
the flushing circuit projects out from the fuel containment structure to an inlet; and
the flushing circuit includes a pump arranged inline between the inlet and the fuel containment plenum.

8. The engine system of claim 5, further comprising an air source configured to provide the air to the flushing circuit.

9. The engine system of claim 8, wherein the air source comprises an environment external to the engine system.

10. The engine system of claim 8, wherein the air source comprises a bleed from the flowpath.

11. The engine system of claim 1, wherein at least one of
a connection between the fuel manifold and the fuel supply line is arranged within the fuel containment plenum; or
a connection between the fuel manifold and at least one of the plurality of fuel injectors is arranged within the fuel containment plenum.

12. The engine system of claim 1, wherein
the fuel delivery system further includes a flow regulator configured to regulate fuel flow to the plurality of fuel injectors; and
the flow regulator is arranged within the fuel containment plenum.

13. The engine system of claim 1, wherein
the fuel manifold includes a plurality of manifold lines and a plurality of manifold fittings interconnecting the plurality of manifold lines; and
the plurality of manifold lines and the plurality of manifold fittings are arranged within the fuel containment plenum.

14. The engine system of claim 1, wherein the engine housing structure is between and fluidly separates the fuel containment plenum from the flowpath.

15. The engine system of claim 1, further comprising:
an aircraft structure;
the engine core housed in the aircraft structure; and
the fuel containment structure between and fluidly separating the fuel containment plenum from a compartment volume within the aircraft structure and extending about the engine core.

16. The engine system of claim 1, wherein the fuel containment structure circumscribes the engine core.

17. An engine system, comprising:
an engine core including a flowpath, a compressor section, a combustor section, a turbine section and an engine case, the flowpath extending through the compressor section, the combustor section and the turbine section from an inlet into the flowpath to an exhaust from the flowpath, and the engine case housing at least a portion of the combustor section;
a fuel containment structure outboard of and connected to the engine case;
a fuel containment plenum formed by and located between the fuel containment structure and the engine case;
a fuel delivery system configured to direct fuel into a combustion chamber within the combustor section, the fuel delivery system comprising a plurality of components arranged within the fuel containment plenum; and
a plenum purge circuit configured to fluidly couple the fuel containment plenum to an external environment.

18. The engine system of claim 17, further comprising a flushing circuit configured to fluidly couple the external environment to the fuel containment plenum.

19. The engine system of claim 17, further comprising:
a pressurized air source; and
a flushing circuit configured to fluidly couple the pressurized air source to the fuel containment plenum.

20. An engine system, comprising:
an engine core including a flowpath, a compressor section, a combustor section, a turbine section and an engine case, the flowpath extending through the compressor section, the combustor section and the turbine section from an inlet into the flowpath to an exhaust from the flowpath, and the engine case housing at least a portion of the combustor section;
a fuel containment structure radially outboard of and circumscribing the engine case;
a fuel containment plenum formed by and located radially between the engine case and the fuel containment structure;
a hydrogen fuel delivery system configured to deliver hydrogen fuel to the combustor section, the hydrogen fuel delivery system comprising a plurality of lines and a plurality of fittings arranged within the fuel containment plenum; and
a plenum purge circuit configured to purge the hydrogen fuel, when leaked into the fuel containment plenum from the fuel delivery system, out of the fuel containment plenum.

* * * * *